United States Patent [19] [11] 4,011,279
Berger et al. [45] Mar. 8, 1977

[54] PROCESS FOR MAKING POLYIMIDE-POLYDIORGANOSILOXANE BLOCK POLYMERS

[75] Inventors: Abe Berger, Schenectady; Peter C. Juliano, Scotia, both of N.Y.

[73] Assignee: General Electric Company, Schenectady, N.Y.

[22] Filed: Sept. 23, 1975

[21] Appl. No.: 615,991

[52] U.S. Cl. .................. 260/824 R; 260/37 SB; 260/46.5 E
[51] Int. Cl.² ..................................... C08L 83/10
[58] Field of Search ................................ 260/824 R

[56] References Cited

UNITED STATES PATENTS

| | | | |
|---|---|---|---|
| 3,288,754 | 11/1966 | Green | 260/824 R |
| 3,325,450 | 6/1967 | Holub | 260/824 R |
| 3,598,783 | 8/1971 | Holub | 260/824 R |
| 3,598,785 | 8/1971 | Holub | 260/824 R |
| 3,736,290 | 5/1973 | Fessler | 260/824 R |
| 3,740,305 | 6/1973 | Hoback | 260/824 R |
| 3,773,718 | 11/1973 | Klebe | 260/824 R |
| 3,884,868 | 5/1975 | Trice | 260/824 R |
| 3,887,636 | 6/1975 | Juliano | 260/824 R |
| 3,926,911 | 12/1975 | Greber | 260/824 R |

*Primary Examiner*—Paul Lieberman
*Attorney, Agent, or Firm*—William A. Teoli; Joseph T. Cohen; Jerome C. Squillaro

[57] ABSTRACT

A process is provided for making polyimides having chemically combined polydiorganosiloxane blocks. An excess organic dianhydride is contacted with an organic diamine in a refluxing halogenated aromatic hydrocarbon solvent in the presence of an acid catalyst to produce an intermediate polyimide product. The temperature of the mixture is thereafter lowered, and amino-terminated polydiorganosiloxane is added to the mixture to effect the incorporation of polydiorganosiloxane blocks into the polyimide. There is produced clear polyimide-polydiorganosiloxane block polymer useful as an insulating layer on semi-conductor devices.

5 Claims, No Drawings

PROCESS FOR MAKING POLYIMIDE-POLYDIORGANOSILOXANE BLOCK POLYMERS

The present invention relates to a method for making polyimides containing chemically combined polydiorganosiloxane blocks.

Prior to the present invention, the method which was used to make polyimide-polydiorganosiloxane block copolymers was based on the use of an organic solvent solution of a polyamide acid-polydiorganosiloxane. Evaporation of the organic solvent converted the polyamide acid to the polyimide state. Besides the generation of polluting organic solvent, water of imidization was also produced which interfered with the use of such polyamide acid-polydiorganosiloxane in particular applications.

Efforts to make polyimide-polydiorganosiloxane block copolymers by forming the polyamide acid-polydiorganosiloxane at elevated temperatures to effect the removal of water of imidization prior to the application of the polyamide acid-polydiorganosiloxane, generally resulted in incompatible polyimide-polydiorganosiloxane block copolymer as shown by a milky white appearance upon compression molding and intrinsic viscosities in the order of 0.2 to 0.5. Although the reason why such incompatibility and low intrinsic viscosity of block copolymer resulted is not completely understood, one possible explanation, is that a significant difference exists between the degree of reactivity of the organic diamine and the amino-terminated polydiorganosiloxane.

The present invention is based on the discovery that polyimide-polydiorganosiloxane block copolymers can be made at intrinsic viscosities of greater than 0.7 at high yields and free of milky white incompatibility by initially forming a polyimide prepolymer in the presence of an acid catalyst from an organic dianhydride and an organic diamine utilizing a stoichiometric excess of the organic dianhydride, and thereafter adding to the polyimide prepolymer the stoichiometric equivalent of the amino terminated polydiorganosiloxane. The later addition of the amino terminated polydiorganosiloxane appeares to achieve more uniform polydiorganosiloxane incorporation.

There is provided by this present invention, a process for making polyimide-polydiorganosiloxane block copolymers which comprises 1. effecting azeotropic water removal from a refluxing mixture of an organic dianhydride, organic diamine and an organic solvent in the presence of an acid catalyst to produce a polyimide prepolymer, where in the refluxing mixture, the ratio of moles of organic dianhydride to moles of organic diamine has a value greater than 1, 2. adding an amount of amino terminated polydiorganosiloxane to the mixture of (1), while it is agitated which is substantially stoichiometrically equivalent to the excess of organic dianhydride added to (1), at temperatures of at least about 20° below the refluxing temperature of (1) while allowing for sufficient time to allow the amino terminated polydiorganosiloxane to react with the polyimide prepolymer, 3. recovering polyimide-polydiorganoxiloxane block copolymer from (2).

Included by the organic dianhydrides which can be used in the practice of the invention either alone or in the form of a mixture of two or more organic dianhydrides or compounds having the following formula

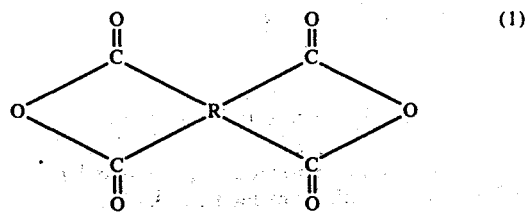

where R is a tetravalent radical containing at least two carbon atoms, no more than two carbonyl groups of said dianhydride attached to any one carbon atom of said tetravalent radical. R is preferably a tetravalent aromatic radical containing at least one ring of six carbon atoms said ring characterized by benzenoid unsaturation, the four carbonyl groups being attached directly to separate carbon atoms in a benzene ring of the R radical and each pair of carbonyl groups being attached to adjacent carbon atoms in a benzene ring of the R radical. R is, preferably, the following radical,

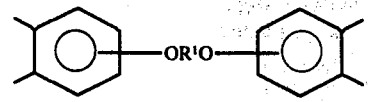

where $R^1$ is a divalent radical selected from the following radicals,

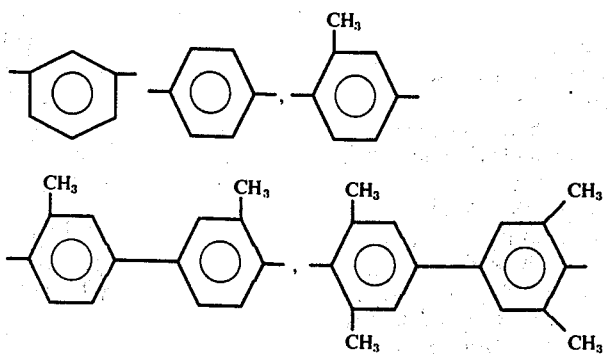

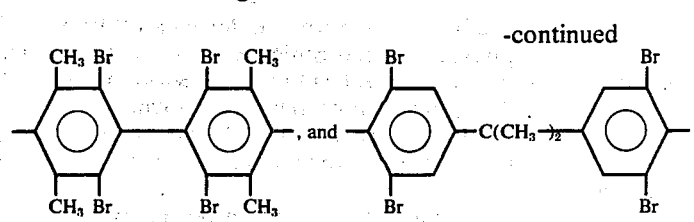

and (b) divalent organic radicals of the general formula

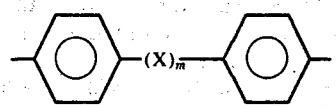

where X is a member selected from the class consisting of divalent radicals of the formulas, $C_yH_{2y}$, $$-\overset{O}{\underset{}{C}}-, \quad -\overset{O}{\underset{\underset{O}{\|}}{S}}-,$$

—O—, and —S—, where $m$ is 0 or 1, $y$ is a whole number from 1 to 5.

The organic diamine which can be used in the practice of the invention are included by the formula $$NH_2R^2NH_2 \qquad (3)$$

where $R^2$ is a divalent organic radical having from 2–30 carbon atoms selected from $C_{(2-10)}$ alkylene radicals, $C_{(4-10)}$ cycloalkylene radicals and $C_{(6-30)}$ aromatic hydrocarbon radicals and halogenated derivatives thereof.

Organic diamines which are included by formula (3) are for example m-phenylenediamine;
p-phenylenediamine;
4,4'-diaminodiphenylpropane;
4,4'-diaminodiphenylmethane; benzidine;
4,4'-diaminodiphenyl sulfide;
4,4'-diaminodiphenyl sulfone;
4,4'-diaminodiphenyl ether;
1,5-diaminoaphthalene;
3,3'-dimethylbenzidine;
3,3'-dimethoxybenzidine;
2,4-diaminotoluene; 2,6-diaminotoluene;
2,4-bis($\beta$-amino-t-butyl)toluene;
bis(p-$\beta$-methyl-o-aminopentyl)benzene;
1,3-diamino-4-isopropylbenzene;
1,2-bis(3-aminopropoxy)ethane;
m-xylylenediamine;
p-xylylenediamine;
bis(4-aminocyclohexyl)methane;
decamethylenediamine;
3-methylheptamethylenediamine;
4,4-dimethylheptamethylenediamine;
2,11-dodecanediamine;
2,2dimethylpropylenediamine;
octamethylenediamine;
3-methoxyhexamethylenediamine;
2,5-dimethylhexamethylenediamine;
2,5-dimethylheptamethylenediamine;
3-methylheptamethylenediamine;
5-methylnonamethylenediamine;
1,4-cyclohexanediamine;
1,12-octadecanediamine;
bis(3-aminopropyl)sulfide;
N-methyl-bis(3-aminopropyl)amine;
hexamethylenediamine;
heptamethylenediamine;
nonamethylenediamine;

The amino terminated polydiorganosiloxane which can be used in the practice of the invention have the formula,

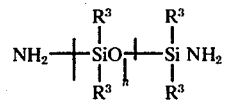

where $R^3$ is the same or different monovalent organic radical selected from the class consisting of hydrocarbon radicals, halogenated hydrocarbon radicals and cyanoalkyl radicals, and n is an integer having an average value of from about 1 to 200 inclusive. Preferably, $R^3$ is methyl, phenyl, trifluoropropyl, cyanoethyl and mixtures thereof.

In the practice of the invention, polyimide-polydiorganosiloxane block copolymers can be made in a stepwise manner by initially forming a polyimide prepolymer and thereafter reacting the polyimide prepolymer with amino terminated polydiorganosiloxane at a lower temperature to produce a polyimide-polydiorganosiloxane block copolymer.

The polyimide-prepolymer can be made by effecting reactions between organic dianhydride and organic diamine, where the organic dianhydride is used in excess and which can be in the form of the mixture of two or more organic dianhydrides as previously defined. The reaction is effected in the organic solvent such as a halogenated aromatic hydrocarbon, for example dichlorobenzene to allow for imidization to occur under reflux conditions. A suitable acid catalyst, such as a non-volatile acid catalyst which is compatible with the reaction mixture is also used. Among the acid catalysts which can be employed are preferably aromatic sulfonic acids, such as toluene sulfonic acid, which can be present at from about 0.1% to about 5% by weight. Other acid catalysts which can be used include higher aliphatic sulfonic acids, which are sufficiently non-volatile along with fluoroalkyl sulfonic acids.

Depending on the refluxing characteristics of the organic solvents used in the mixture, the mixture can be refluxed at a temperature in the range of between 180° C to 260° C while higher or lower temperatures can be used limited merely by the decomposition temperature, or refluxing temperature of the organic solvent employed. Reaction in forming the polyimide prepolymer can usually be completed within about four hours, although reactions as long as 48 hours are not unusual. The reaction is complete when stoichiometric amount of water is removed by azeotropic distillation.

At the completion of the polyimide prepolymer reaction, the mixture can be allowed to cool to a temperature of about 20° to 30° C below the reflux temperatures. The amino terminated polydiorganosiloxane is then added in an amount which is substantially the stoichiometric equivalent of the excess of organic dianhydride added to make the polyimide prepolymer. The reaction can proceed at from about one hour or less to five hours or more depending upon which factors as degree of agitation, the amount of polydiorganosiloxane incorporated, the nature of the reactants, etc.

Recovery of the final block copolymer can be achieved by slowly pouring the reaction mixture into a precipitating solvent such as methanol along with a high degree of agitation. Depending upon the characteristics desired in the block copolymer, the weight percent silicone can vary in the range of from about 10% to about 70% based on the weight of block copolymer.

The block copolymers made in accordance with the method of the present invention can be further reinforced with various reinforcing fillers such as fume silica, aluminum oxide, etc., in proportion from about 10 to 100 parts of filler per 100 parts of block copolymer. The block copolymers of the present invention can be used in a variety of applications such as for wire coating, for making use as a passivating layer on semiconductor devices, etc.

In order that those skilled in the art will be better able to practice the invention the following examples are given by way of illustration and not by way of limitation. All parts are by weight.

EXAMPLE 1

A mixture of 0.5940 parts of methylenedianiline and 2.6 parts of 2,2-bis(4-)3,4-dicarboxyphenoxy)phenyl) propane dianhydride and about 480 parts of orthodichlorobenzene was heated at a temperature of 184° C in the presence of about 1% by weight of toluene sulfonic acid based on the total weight of solids in the mixture. The mixture was refluxed at a pot temperature of between 240°–260° C until all of the water of reaction was completely removed. The bath temperature was then lowered to 210° C and 0.5165 part of the amino alkyl terminated polydimethylsiloxane having an average of about 27 chemically combined dimethylsiloxy units and terminal dimethylalkylamino units was added with stirring to the mixture. The mixture was agitated for an additional 6 hours while the while the mixture was maintained at a temperature of below about 210° C. The mixture was then allowed to cool and added to methanol to effect the precipitation of reaction product which was found to be a gel-free polyimide copolymer product. The product was then filtered, washed and dried and redissolved in methylene chloride. It was then reprecipitated from methanol. Based on method of preparation, the product was a polyetherimide-polydimethylsiloxane block copolymer having an intrinsic viscosity of 0.72 in methylene chloride. The product was recovered at about a 95% yield.

The above polyetherimide-polydimethylsiloxane block copolymer was dissolved in methylene chloride to produce a 10% block copolymer solution. The block copolymer solution is then applied onto a silicon wafer. The solution is allowed to evaporate to produce a silicon wafer coated with a passivating layer of polyimide-polydiorganosiloxane block copolymer.

EXAMPLE 2

A mixture of 0.972 part of methylene dianiline and 5.2 parts of the bis(etheranhydride) of Example 1 was refluxed in 240 parts of orthodichlorobenzene and in the presence of about 1% by weight of toluene sulfonic acid based on the weight of mixture. After about 3 hours of reflux, there was then added to the mixture, 0.2584 part of the amino terminated polydimethylsiloxane of Example 1 to produce a mixture having a substantially equal molar amount of organic dianhydride, and diamine, where the diamine consisted of about 10 mole percent of the amino alkyl terminated polydimethylsiloxane and about 90 mole percent of the methylene dianiline. The addition of the silicon diamine was effected at a pot temperature of about 210° C with stirring and the reaction mixture was agitated for an additional 3 hours. A 96% yield of polyetherimide-polydimethylsiloxane copolymer was obtained. The intrinsic viscosity of the polyetherimide-polydimethyl block copolymer was 0.94.

Additional polyetherimide-polydimethylsiloxane block copolymers were prepared utilizing as high as 65 mole percent of the amino alkyl terminated polydimethylsiloxane base on the total moles of diamine reacted with aromatic ether dianhydride. It was found that the intrinsic viscosity of the polyetherimide-polydimethylsiloxane block copolymer using 65 mole percent of the polydimethylsiloxane diamine and 35 mole percent of methylenedianiline was 0.53; the copolymer yield was about 91 percent. All of the various polyetherimide-polydimethylsiloxane block copolymers were found useful as insulating coatings when extruded onto copper wire and were clear materials.

Although the above examples are limited to only a few of the very many polyetherimide-polydimethylsiloxane copolymers which can be made in accordance with the method of the present invention, it should be understood that a much broader variety of such block copolymers can be made, as shown by the description and particularly formulas 1–3 preceding these examples.

In addition to the radicals shown above in $R^1$, it should be further understood that $R^1$ also include radicals such as

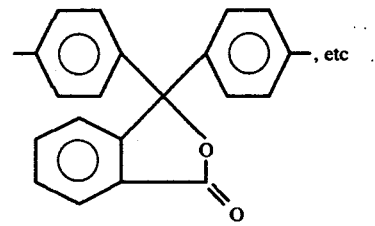

and other radicals, of the "Cardo" type shown in Cardo Polymers, J. Macromol Sci-Rev. Macromol Chem C11(1), 45–142 (1974).

What we claim as new and desire to secure by Letters Patent of the United States is:

1. A method for making polyimide-polydiorganosiloxane block copolymer which comprises:
   1. effecting azeotropic water removal from a refluxing mixture of an organic dianhydride and organic diamine in the presence of an organic solvent and an effective amount of an organic acid catalyst where the ratio of the organic dianhydride to the organic diamine utilized in the mixture has a value greater than 1, 2. allowing the reaction mixture of 1 to cool to a temperature of at least 20° C and adding to the resulting mixture an amount of amino alkyl terminated polydiorganosiloxane which is substantially the stoichiometric equivalent to the excess of organic dianhydride utilized in the mixture of 1, and agitating the resulting mixture for a time sufficient to effect polyimide-polydiorganosiloxane block copolymer formation, 3. recovering the polyimide-polydiorganosiloxane block copolymer from (2).

2. A method in accordance with claim 1, where the amino alkyl terminated polydiorganosiloxane is an amino alkyl terminated polydimethylsiloxane.

3. A method in accordance with claim 1, where the organic acid catalyst is toluene sulfonic acid.

4. A method in accordance with claim 1, where the organic dianhydride is 2,2-bis[4-(3,4-dicarboxyphenoxy) phenyl] propane dianhydride.

5. A method in accordance with claim 1, where the organic diamine is methylenedianiline.

* * * * *